United States Patent [19]
Kato et al.

[11] Patent Number: 4,822,384
[45] Date of Patent: Apr. 18, 1989

[54] OXYGEN ENRICHING APPARATUS WITH MEANS FOR REGULATING OXYGEN CONCENTRATION OF OXYGEN ENRICHED GAS

[75] Inventors: Akira Kato; Terukuni Ikuta, both of Iwakuni; Masamichi Tamada, Kobe, all of Japan

[73] Assignee: Teijin Limited, Osaka, Japan

[21] Appl. No.: 99,343

[22] Filed: Sep. 21, 1987

[30] Foreign Application Priority Data

Sep. 22, 1986 [JP] Japan ................. 61-222055
Sep. 22, 1986 [JP] Japan ................. 61-222056
Dec. 25, 1986 [JP] Japan ................. 61-307885
Dec. 26, 1986 [JP] Japan ................. 61-308516

[51] Int. Cl.$^4$ ................. B01D 53/22; B01D 53/04
[52] U.S. Cl. ................. 55/158; 55/179; 55/270; 55/271; 55/387; 55/389; 55/417
[58] Field of Search ................. 55/16, 18, 21, 25, 26, 55/31, 68, 74, 75, 158, 161–163, 179, 270, 271, 387, 389, 417

[56] References Cited

U.S. PATENT DOCUMENTS

| | | | |
|---|---|---|---|
| 3,922,149 | 11/1975 | Ruder et al. | 55/25 X |
| 3,930,813 | 1/1976 | Gessner | 55/16 |
| 3,930,814 | 1/1976 | Gessner | 55/16 |
| 3,979,190 | 9/1976 | Hedman | 55/16 X |
| 4,174,955 | 11/1979 | Blackmer et al. | 55/16 X |
| 4,198,213 | 4/1980 | Mannatt | 55/16 |
| 4,349,357 | 9/1982 | Russell | 55/163 X |
| 4,378,982 | 4/1983 | McCombs | 55/179 X |
| 4,428,372 | 1/1984 | Beysel et al. | 55/21 X |
| 4,449,990 | 5/1984 | Tedford, Jr. | 55/26 |
| 4,502,873 | 3/1985 | Mottram et al. | 55/179 |
| 4,516,424 | 5/1985 | Rowland | 55/21 X |
| 4,537,606 | 8/1985 | Itoh et al. | 55/158 |
| 4,537,607 | 8/1985 | Rogers et al. | 55/179 X |
| 4,545,790 | 10/1985 | Miller et al. | 55/179 X |
| 4,552,571 | 11/1985 | Dechene | 55/21 |
| 4,561,287 | 12/1985 | Rowland | 55/21 X |
| 4,576,616 | 3/1986 | Mottram et al. | 55/163 X |
| 4,584,001 | 4/1986 | Dechene | 55/163 X |
| 4,614,525 | 9/1986 | Reiss | 55/25 |
| 4,632,677 | 12/1986 | Blackmer | 55/158 |
| 4,648,888 | 3/1987 | Rowland | 55/21 |
| 4,661,124 | 4/1987 | Hamlin et al. | 55/163 X |
| 4,681,099 | 7/1987 | Sato et al. | 55/179 X |
| 4,698,075 | 10/1987 | Dechene | 55/163 |

Primary Examiner—Robert Spitzer
Attorney, Agent, or Firm—Kenyon & Kenyon

[57] ABSTRACT

An apparatus for producing an oxygen enriched gas having a compressor for supplying air under pressure, a unit for producing a gas enriched with oxygen from the air supplied from the compressor, a gas storage tank for reserving the oxygen enriched gas produced from the producing unit, a flow rate setting unit to set a flow rate of the oxygen enriched gas delivered from the gas storage tank, and a regulating unit for adjustably regulating an oxygen concentration of the oxygen enriched gas in response to a change in a requirement of an oxygen concentration of the oxygen enriched gas obtained at an outlet of the apparatus.

31 Claims, 9 Drawing Sheets

OXYGEN ENRICHING APPARATUS WITH MEANS FOR REGULATING OXYGEN CONCENTRATION OF OXYGEN ENRICHED GAS

BACKGROUND OF THE INVENTION

1. Field of the Invention

The present invention relates to an apparatus for producing an oxygen enriched gas, particularly, oxygen enriched air, from atmospheric air, and more particularly, relates to an oxygen enriching apparatus adapted for use in the treatment of patients suffering from ailments such as asthma, emphysema, and chronic bronchitis, and provided with a means for regulating a concentration of oxygen in the oxygen enriched gas.

2. Description of the Related Art

The adoption of oxygen inhalation for the treatment of patients suffering from respiratory ailments such as asthma, emphysema, and chronic bronchitis is well known, and such an oxygen inhalation treatment employs an oxygen gas or oxygen enriched air. Heretofore, the oxygen gas or the oxygen enriched air has been supplied by conventional gas cylinders, but recently an oxygen enriching apparatus producing an oxygen enriched air from the atmospheric air has been developed and is in practical use. This apparatus is convenient to use and easily maintained.

There are two types of the above oxygen enriching apparatus; a membrane separation type oxygen enriching apparatus as disclosed in U.S. Pat. No. 4,174,955, which utilizes a membrane permitting a selective permeation of oxygen more readily than nitrogen, and an adsorbing type oxygen enriching apparatus as disclosed in, e.g., U.S. Pat. No. 4,576,614 and Published European Patent Application No. 0 135 936, which employs an adsorbent adsorbing nitrogen more readily than oxygen. The membrane separation type oxygen enriching apparatus obtains an oxygen enriched gas with a 40 volume % concentration of oxygen, due to the selective permeation property of the membrane. The adsorbing type oxygen enriching apparatus obtains an oxygen enriched gas with a 90 volume % concentration of oxygen, due to a stable separation of oxygen or nitrogen from the source gas, such as the atmospheric air.

In the treatment of patients suffering from respiratory ailments by oxygen inhalation, either a low oxygen concentration gas with approximately a 40 volume % of oxygen or a high oxygen concentration gas with approximately a 90 volume % of oxygen is required, depending on the condition of the patient. Thus, in the conventional oxygen inhalation treatment using an oxygen enriching apparatus, the membrane separation type oxygen enriching apparatus is used for supplying patients with a low oxygen concentration gas, and the adsorbing type oxygen enriching apparatus is used for supplying patients with a high oxygen concentration gas. That is, at clinical sites such as hospitals, both the membrane oxygen enriching and adsorbing type oxygen enriching apparatuses must be installed to carry out an oxygen inhalation treatment and this is very inconvenient.

The adsorbing type oxygen enriching apparatus as disclosed in the afore-mentioned U.S. Pat. No. 4,576,614 or Published European Patent Application No. 0 135 936 is provided with a means for changing an oxygen or nitrogen concentration as required. However, this means for changing an oxygen concentration or nitrogen concentration is difficult to operate.

Further, when the oxygen inhalation treatment is carried out, the flow rate of the oxygen enriched gas supplied from an oxygen enriching apparatus to the nasal cavities of a patient must be controlled to an appropriate level, and in the conventional oxygen enriching apparatus, a rotameter having a float is employed to measure the flow rate of the oxygen enriched gas. However, the float of the rotameter fluctuates and produces an irregular flow, and thus it is difficult for the patient to set the flow rate to a required level or to read the scale indicating the flow rate of the gas. Therefore, there has been a need for the development of a flow rate measuring device for an oxygen enriching apparatus, in which it is easy to set a flow rate and the flow rate is clearly indicated.

Moreover, in the case of the conventional adsorbing type oxygen enriching apparatus used to produce an oxygen enriched gas with a 90 volume % concentration of oxygen, when a flow rate control valve is widened so as to increase an amount of flow of the oxygen enriched gas from the outlet of the apparatus, the oxygen concentration is unfavorably varied. Accordingly, the conventional adsorbing type oxygen enriching apparatus is impractical.

SUMMARY OF THE INVENTION

Therefore, an object of the present invention is to obviate the various defects encountered by the conventional oxygen enriching apparatus.

Another object of the present invention is to provide an oxygen enriching apparatus capable of stably producing an oxygen enriched gas with at least both a low oxygen concentration of approximately a 40 volume % and a high oxygen concentration of approximately a 90 volume %.

A further object of the present invention is to provide an oxygen enriching apparatus with a means for regulating the oxygen concentration of the oxygen enriched gas, which is easy to operate when regulating the oxygen concentration and is sufficiently compact in size that it can be used in the home.

A still further object of the present invention is to provide an oxygen enriching apparatus provided with a flow rate metering device by which a flow rate of an oxygen enriched gas from an outlet of the apparatus can be easily set and by which the measured amount of flow of the oxygen enriched gas is clearly indicated.

A further object of the present invention is to provide a flow rate metering device which provides an accurate measurement of an oxygen enriched gas from a membrane separation type oxygen enriching apparatus in which dewdrops may be generated within the oxygen enriched gas.

In accordance with the present invention, there is provided an apparatus for producing an oxygen enriched gas from air comprising:

an air source unit for supplying air to be enriched with oxygen;

a unit for producing a gas enriched with oxygen from the air supplied from the air source;

a first conduit means for a fluid connection between the air source unit and the unit for producing a gas enriched with oxygen;

a gas storage unit for reserving a given amount of the oxygen enriched gas produced by the unit for producing a gas enriched with oxygen;

a second gas conduit means for a fluid connection between the unit for producing a gas enriched with oxygen and the gas storage unit;

a third gas conduit means for delivering the oxygen enriched gas from the gas storage unit toward an outlet of the apparatus;

a flow rate setting unit for setting a flow rate of the oxygen enriched gas delivered from the gas storage unit to the outlet of the apparatus via the third gas conduit means, the flow rate setting unit being arranged in the third conduit means; and a concentration regulating unit for adjustably regulating an oxygen concentration of the oxygen enriched gas delivered from the outlet of the apparatus in response to a change in a required oxygen concentration of the oxygen enriched gas.

BRIEF DESCRIPTION OF THE DRAWINGS

The above and other objects, features and advantages of the present invention will become apparent from the ensuing description of the embodiments illustrated in the accompanying drawings wherein.

DESCRIPTION OF THE PREFERRED EMBODIMENTS

Figure 1:
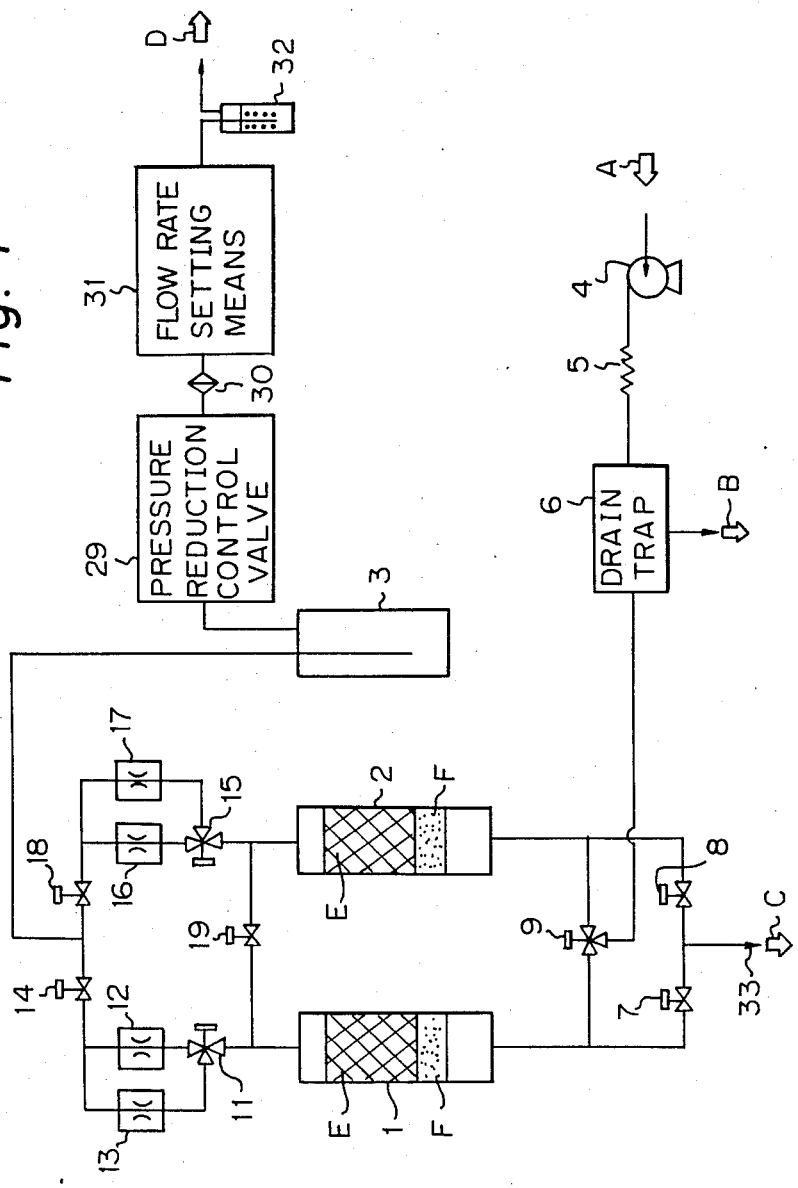
FIG. 1 is a diagrammatic view of an oxygen enriching apparatus according to an embodiment of the present invention.

The components and operation of various embodiments of the present invention will now be described with reference to the accompanying drawings. It should be noted that, throughout the drawings illustrating various embodiments of the present invention, identical and like parts or members are designated by the same reference numerals.

Referring to FIG. 1 which illustrates an oxygen enriching apparatus for producing an oxygen enriched gas from the atmospheric air according to a first embodiment of the present invention, the apparatus has two adsorbing beds 1 and 2 filled with an adsorbent E capable of selectively adsorbing nitrogen more readily than oxygen. The adsorbing beds 1 and 2 also may be filled with another adsorbent F, as required, which is capable of selectively adsorbing a water component in the gas which passes through the beds 1 and 2. The two adsorbing beds 1 and 2 are alternately supplied with air A under pressure from a compressor 4, via an air cooling device 5, a drain trap 6 for trapping a drain B, and a three way valve 9 which can be switched to permit the air A under pressure to alternately flow toward either one of the adsorbing beds 1 and 2. The air A under pressure is subjected to an adsorbing process by the adsorbing bed 1 or 2 so that nitrogen in the air A is adsorbed by the adsorbent E of the adsorbing bed 1 or 2. Thus, an oxygen enriched gas is obtained at the outlet of the adsorbing bed 1 or 2. For example, the oxygen enriched gas obtained from the adsorbing bed 1 flows through a three way valve 11, one of two orifices 12 and 13, and a shut-off valve 14 into a storage tank 3. The three way valve 11 is operated to choose which orifice 12 or 13 is used for the flow therethrough of the oxygen enriched gas toward the storage tank 3. As described later, the orifices 12 and 13 define two different extents of opening, thereby applying different flow resistances to the flow of the oxygen enriched gas. The oxygen enriched gas obtained from the adsorbing bed 2 flows through a three way valve 15 similar to the three way valve 11, one of two orifices 16 and 17 similar to the orifices 12 and 13, and a shut-off valve 18, into the storage tank 3. The oxygen enriched gas stored in the storage tank 3 is delivered therefrom for an intended use, via a pressure reduction control valve 29 for adjusting a pressure of the oxygen enriched gas to a constant level, a filter element 30, such as a disinfecting filter element, a flow rate setting means 31 for setting an appropriate flow rate of the delivered gas, and a humidifier 32, such as an air-bubble type moistener. Accordingly, the oxygen enriched gas designated by D and having a regulated oxygen concentration is delivered at a regulated flow rate from an outlet (not shown) of the apparatus.

The oxygen enriching apparatus of FIG. 1 is also provided with shut-off valves 7, 8, and 19. The valves 7 and 8 are arranged so that, when these valves 7 and 8 are opened, an inlet of each of the adsorbing beds 1 and 2 is fluidly connected to an exhaust port 33 through which a nitrogen enriched gas obtained by desorbing can be taken out. Thus, the valve 7 is closed while the adsorbing bed 1 is adsorbing the nitrogen, and the valve 8 is closed while the adsorbing bed 2 is adsorbing the nitrogen. The shut-off valve 19 is arranged between the outlets of the adsorbent beds 1 and 2. The valves 7, 8, and 19 are used for the process of desorbing nitrogen from the beds 1 and 2 after the completion of each nitrogen adsorbing process of the beds 1 and 2. That is, for example, when the adsorbing process of the adsorbent bed 1 is completed (the valve 7 is still closed), the shut-off valves 8, 14, and 18 are closed and the shut-off valve 19 is kept open so that the adsorbing beds 1 and 2 are in communication with one another. As a result, the pressure level of the bed 1 becomes equal to that of the bed 2, which has already been subjected to a desorbing process and is at a normal pressure level. Thereafter, the shut-off valves 8 and 19 are closed and the shut-off valve 18 is opened. Moreover, the three way valve 9 is switched so that the air A under pressure fed from the compressor 4 flows into the adsorbing bed 2 and as a result, the adsorbing bed 2 starts the adsorbing process. The three way valve 15 is used to select either one of the orifices 16 and 17. At this stage, the shut-off valve 7 is opened, and subsequently the shut-off valve 14 is reopened so that a part of the oxygen enriched gas from the adsorbing bed 2 is brought into the adsorbing bed 1 in the counter-flow direction via the outlet of the bed 1. Thus, the adsorbing bed 1 is subjected to a desorbing process, i.e., a reclaiming process, by a counter-flow of oxygen enriched gas. Accordingly, a nitrogen enriched gas C flowing out of the inlet of the adsorbing bed 1 is exhausted from the exhaust port 33. The above-described adsorbing and desorbing processes are alternately repeated at each of the adsorbing beds 1 and 2, and a variable pressure type adsorbing treatment is carried out alternately by each of the beds 1 and 2. In the oxygen enriching apparatus of FIG. 1, the flow rate setting means 31 may comprise a flow metering element having a plurality of selectively settable apertures having different opening areas, respectively. Further, the flow rate setting means 31 also comprise a combination of a conventional flow control valve and a later-described inferential flow metering device.

At this stage, a change in the flow rate of the oxygen enriched gas D regulated by the flow rate setting means 31 should not adversely affect a pressure condition within the adsorbing beds 1 and 2. Therefore, the flow rate setting means 31 preferably has an opening to purge a regulated amount of gas, to the outside, so that the total of the regulated flow of the oxygen enriched gas and the purged flow of the oxygen enriched gas is always maintained at an approximately constant value. Therefore, the flow rate setting means 31 is preferably constituted by a combination of a conventional rotameter with a purge opening and a regulating valve.

In accordance with the embodiment of the oxygen enriching apparatus of FIG. 1, the orifices 12, 13, 16, and 17 are arranged on the outlet sides of the adsorbing beds 1 and 2, and function as a choke element in a flow of a fluid, respectively. That is, each of the orifice 12, 13, 16, and 17 applies a flow resistance to the flow of the fluid, i.e., the flow of the oxygen enriched gas in the case of the present embodiment. The cross-sectional area of the orifice 12 and that of the orifice 13 are not the same, so that the flow resistance applied by the orifice 12 is different from that applied by the orifice 13. As a result, according to the difference of the flow resistance between the orifices 12 and 13, it is possible to change and regulate an oxygen concentration of the oxygen enriched gas obtained from the adsorbing bed 1. For example, the cross-sectional area of the orifice 12 is chosen so as to obtain an oxygen enriched gas D with an approximately 90 volume % oxygen concentration, and the cross-sectional area of the orifice 13 is larger than that of the orifice 12 and chosen so as to obtain an oxygen enriched gas D with an approximately 40 volume % oxygen concentration. Preferably, the cross-sectional area of the orifice 16 is made approximately equal to that of the orifice 12, and the cross-sectional area of the orifice 17 is made approximately equal to that of the orifice 13.

When the oxygen enriching apparatus of FIG. 1 is in practical use, the following operational steps are preferably adopted. That is, for example, when the desorbing of the adsorbing bed 1 is to be carried out, the pressure level of the bed 1 is initially reduced to a normal pressure condition. Then, immediately after the normal pressure condition is obtained, the orifice 13 having a larger orifice cross-sectional area is first used to introduce a larger amount of the desorbing gas into the bed 1, and thereafter, the orifice 12 having a smaller orifice cross-sectional area is used to introduce a reduced amount of the desorbing gas into the adsorbing bed 1. Further, for example, when the adsorbing process of the adsorbing bed 1 is started, the air A under pressure is fed into the adsorbing bed 1 by keeping the shut-off valve 14 closed, so that a predetermined high pressure level prevails in the adsorbing bed 1. Then, when the predetermined pressure level of the bed 1 is established, the shut-off valve 14 is opened. Thus, the adsorbing bed 1 can be maintained at a constant high pressure level during the adsorbing process, and accordingly, an oxygen enriched gas with a high oxygen concentration can be obtained.

Figure 2:
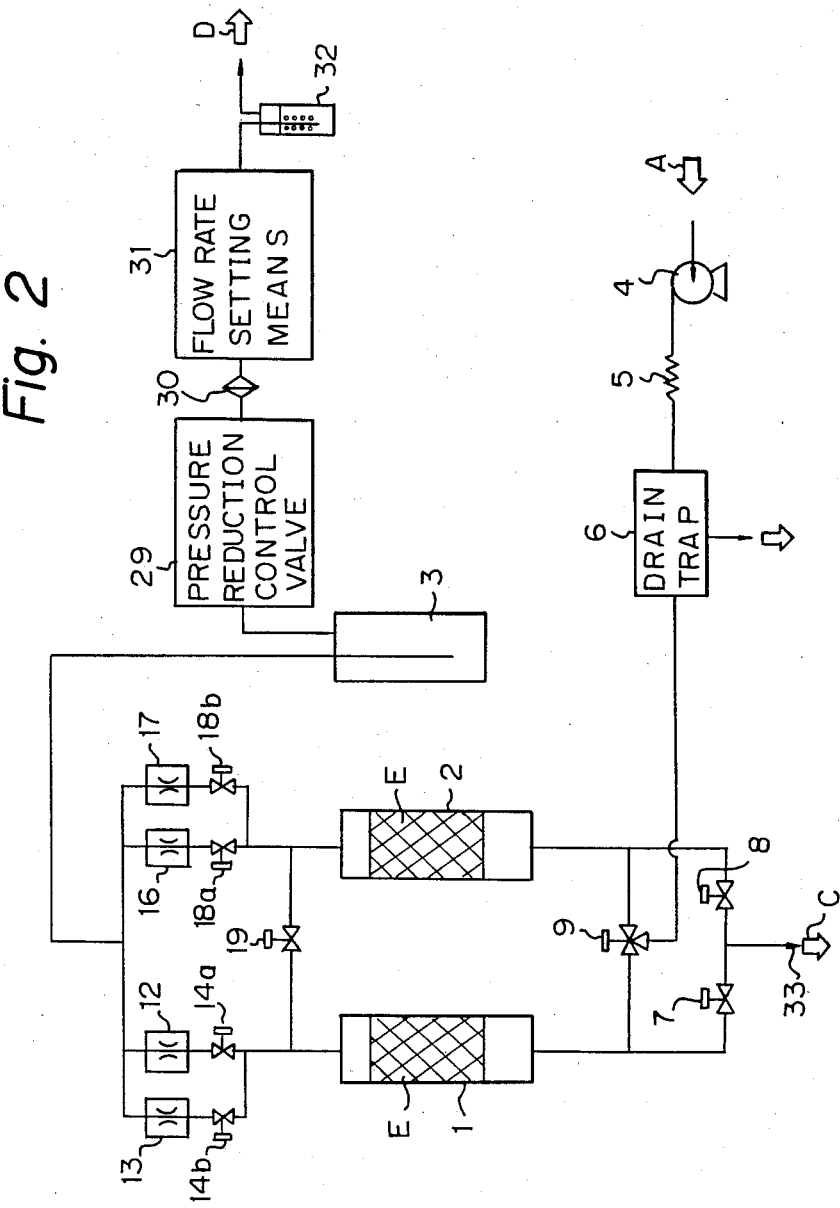
FIG. 2 is a diagrammatic view of an oxygen enriching apparatus according to another embodiment of the present invention.

FIG. 2 illustrates another embodiment of the oxygen enriching apparatus which is different from the apparatus of FIG. 1 in that the three way valves 11 and 15 of FIG. 1 are replaced with shut-off valves 14a, 14b, 18a, and 18b. Further, the shut-off valves 14 and 18 are omitted. However, the function of the orifices 12, 13, 16, and 17 of the apparatus of FIG. 2 is substantially the same as that of the orifices 12, 13, 16, and 17 of the apparatus of FIG. 1. That is, the combination of the orifices 12, 13, 16, and 17 and the shut-off valves 14a, 14b, 18a, and 18b constitute an oxygen concentration regulator.

At this stage, since the above-described orifices 12, 13, 16, and 17 of the apparatus according to the two embodiments of FIGS. 1 and 2 function as a choke element in a flow of a fluid, respectively, each of the orifices may be replaced by a flow nozzle element or a Venturi tube which is capable of functioning as a flow choke element. Moreover, in the parallel arrangement of the orifices 12, 13, 16, and 17 of the above-described embodiments of FIGS. 1 and 2, the two different oxygen concentrations, i.e., 40 volume % and 90 volume % oxygen concentrations, can be established. However, if three or more oxygen concentrations, such as 40 volume %, 65 volume %, and 90 volume % are required, the number of the orifices may be increased correspondingly, and further, the parallel arrangement of the orifices may be changed to a serial arrangement or a combination of the serial and parallel arrangements may be employed as required.

· In the apparatus of the described embodiments, the oxygen concentration of the oxygen enriched gas D may change in response to a change in a flow rate of the oxygen enriched gas taken from the outlet of the apparatus. It has, however, been experimentarily confirmed that such a change of oxygen concentration is within the limit of ±5%, and that where the flow rate of the gas D ranges from 2 to 5 l/min, which is most frequently used for the oxygen inhalation by a patient, a change in the oxygen concentration is within the limit of ±3%. Thus, the oxygen concentration of the oxygen enriched gas D obtained from the apparatus of the embodiments is stable. At this stage, it should be understood that the volume of the storage tank 3 is preferably within the range of 3 to 10 liters.

Figure 3:
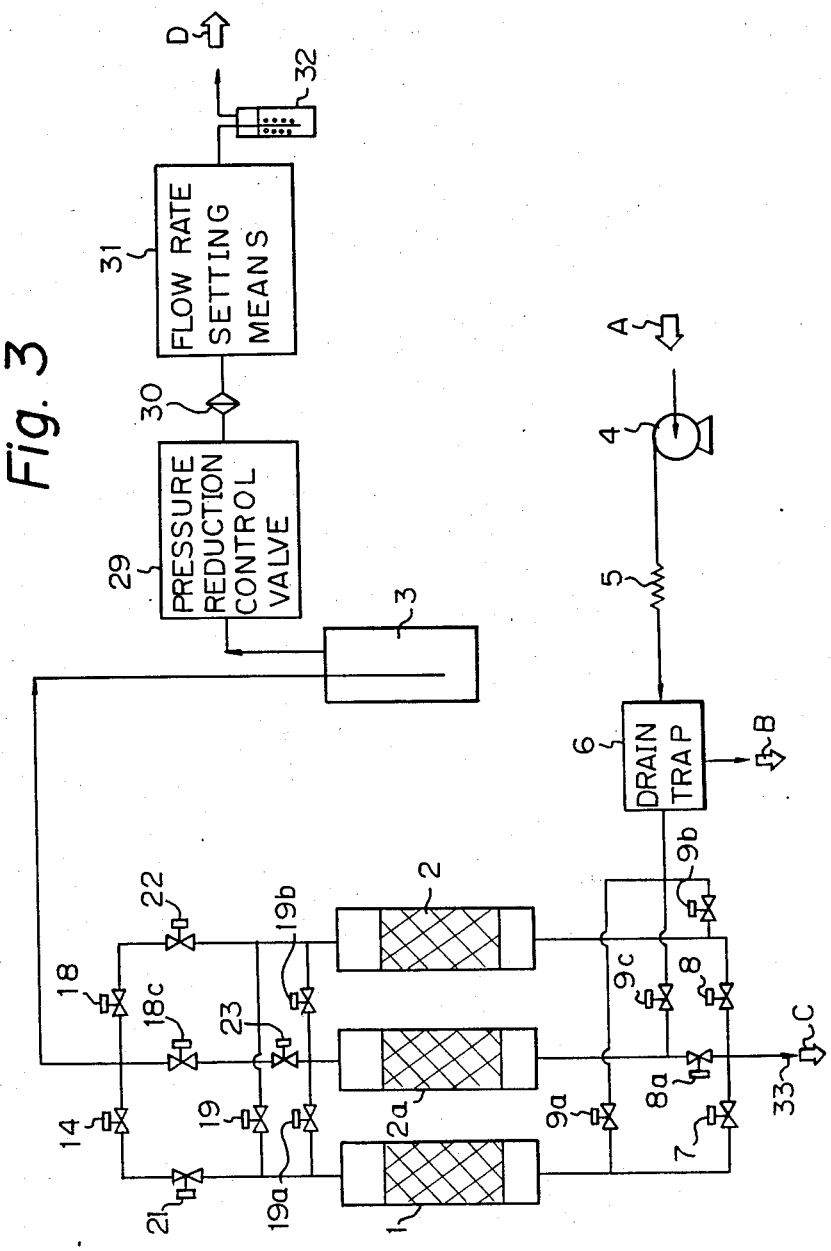
FIG. 3 is a diagrammatic view of an oxygen enriching apparatus according to a further embodiment of the present invention.

FIG. 3 illustrates a further embodiment of the oxygen enriching apparatus of the present invention. The embodiment of FIG. 3 is different from the previous embodiments in that a third adsorbing bed 2a, in addition to the beds 1 and 2, is employed, and that the oxygen concentration of the oxygen enriched gas D obtained from the outlet of the apparatus is achieved by the employment of flow control valves, particularly, needle valves 21 to 23 capable of functioning as a flow choke elements, respectively. Further, the three way valve 9 of the embodiment of FIG. 1 or 2 is replaced by three shut-off valves 9a, 9b, and 9c so that either one or two of the three adsorbing beds 1, 2, and 2a are alternately used for the adsorbing process to produce an oxygen enriched gas from the air A under pressure fed by the compressor 4. According to the provision of the third adsorbing bed 2a, shut-off valve 18c is arranged between the adsorbing bed 2a and the storage tank 3, and shut-off valves 19a and 19b are arranged between the bed 2a and the other adsorbing beds 1 and 2, respectively. The shut-off valves 19a and 19b are used in the same manner as the valve 19 for reducing the pressure levels of the adsorbing beds 1, 2, and 2a after the completion of the adsorbing process.

The cross-sectional opening area of each of the needle valves 21 to 23 may be adjusted so that a continuous adjustment of the flow choke in the flow of the oxygen enriched gas can be achieved. However, in order to accurately obtain several desired oxygen concentrations of the oxygen enriched gas, such as 40 volume %, 65 volume %, and 90 volume % oxygen concentrations, each of the needle valves 21 to 23 is preferably provided with an appropriate internal stop, to ensure that an accurate adjustment of each valve 21, 22, or 23 is carried out in a stepwise manner. Alternatively, each of the needle valves 21 to 23 may be replaced by a flow rate setting device having more than two different openings through which the oxygen enriched gas flows.

According to the provision of the third adsorbing bed 2a of the embodiment of FIG. 3, the flow rate of the oxygen enriched gas can be increased. In the medical treatment of a patient, a maximum flow rate of 6 l/min is often required, and thus the number of adsorbing beds may be further increased on the basis of the arrangement of the apparatus of FIG. 2, as required. However, if only a single adsorbing bed is used, the oxygen enriching apparatus may be made compact and suitable to be used in, for example, a home.

In the above-described embodiments of FIGS. 1 to 3, the adsorbent filling E of each of the adsorbing beds 1, 2 and 2a may be a regeneratable synthetic zeolite which adsorbs nitrogen more readily than oxygen, such as zeolite 5A or zeolite 13X. The adsorbent F for adsorbing a water component in the air A may be a silica or alumina.

Further, the compressor 4 may be replaced by a blower type air supplier if needed. Also, a suitable conduit or conduits may be provided to connect the inlet of the adsorbing bed 1, 2, or 2a to the suction side of the compressor 4 during the desorbing process of each bed, to enhance the desorbing efficiency.

Figure 4A:
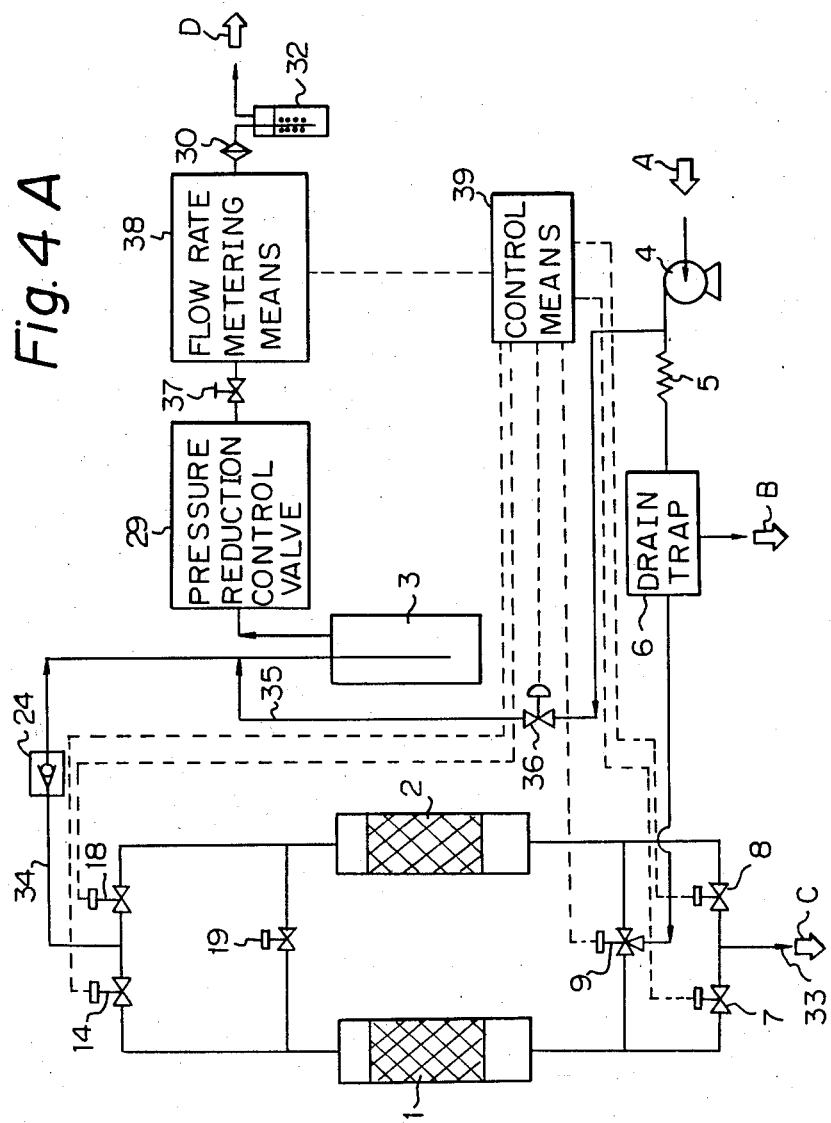
FIG. 4A is a diagrammatic view of an oxygen enriching apparatus according to a still further embodiment of the present invention.
Figure 4:
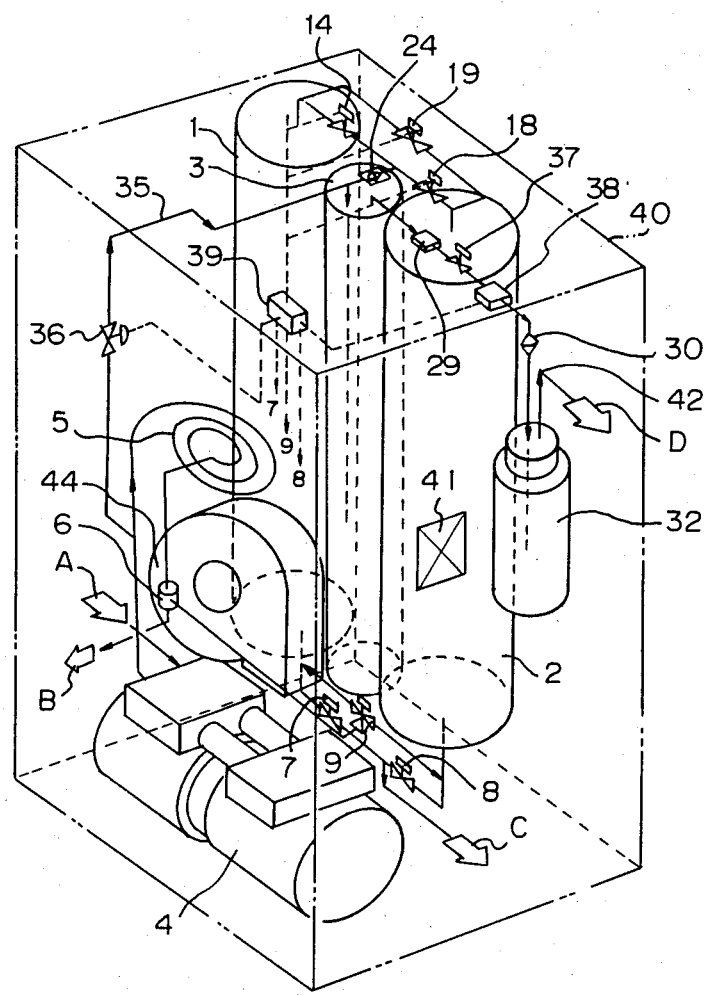
FIG. 4B is a perspective view of the oxygen enriching apparatus of FIG. 4A.

FIG. 4A illustrates an adsorbing type oxygen enriching apparatus according to a further embodiment of the present invention. As illustrated in FIG. 4A, the apparatus has many elements similar to those of the apparatuses of the embodiments of FIGS. 1 and 2, and is able to produce, from air A under pressure, an oxygen enriched gas D to be delivered from an outlet thereof. However, the flow choke elements are not provided at the outlet sides of the adsorbing beds 1 and 2.

On the other hand, in the oxygen enriching apparatus of the present embodiment, a check valve 24 is arranged in a gas conduit 34 extending from adsorbing beds 1 and 2 to an inlet of a storage tank 3 on the upstream side of the inlet of the storage tank 3, to prevent the oxygen enriched gas from flowing in the opposite direction from the storage tank 3 toward the adsorbing beds 1 and 2. Moreover, a gas conduit 35 is provided as a bypass conduit for supplying the upstream portion of the storage tank 3 with a portion of the air A under pressure fed by the compressor 4. A flow control valve 36 is disposed in the gas conduit or bypass conduit 35 to non-continuously control the amount of flow of the air A under pressure in relation to a required oxygen concentration level of the oxygen enriched gas D delivered from the outlet of the apparatus. That is, the flow control valve 36 can be operated so as to control the amount of flow of the air A under pressure flowing through the bypass conduit 35, in order to obtain not only a 90 volume % oxygen concentration but also a 40 volume % oxygen concentration of the oxygen enriched gas D. When 40 volume % oxygen concentration is required, the opening area of the flow control valve 36 is made wider than for a 90 volume % oxygen concentration. At this stage, in the apparatus of the present embodiment, another flow control valve 37 and a flow rate metering means 38, as described with reference to a later embodiment, are arranged in a gas conduit extending from the storage tank 3 to the outlet of the apparatus, and these two elements 37 and 38 comprise a flow rate setting means having a function similar to the flow rate setting means 31 of the embodiment of FIGS. 1 and 2. The flow rate metering means 38 is operatively connected to the flow control valve 36 to operate the flow control valve 36 in association with the metering operation of the flow rate metering means 38. More specifically, the flow rate metering means 38 is electro-mechanically connected to the flow control valve 36 via a controller 39 which may be a conventional microprocessor unit. Thus, it is possible to operate the flow control valve 36 so that a fine adjustment of the amount of the air A under pressure flowing through the bypass conduit 35 can be achieved in response to a change in a flow rate of the oxygen enriched gas D delivered from the outlet of the apparatus. For example, when the flow rate of the oxygen enriched gas D is increased by the flow control valve 37, the flow rate metering means 38 issues a signal indicating an increase in the flow rate of the oxygen enriched gas D toward the controller 39. As a result, the controller 39 operates the flow control valve 36 to increase an amount of flow of the air A under pressure flowing through the bypass conduit 35. Consequently, within the limit of the flow rate of the oxygen enriched gas, which is less than approximately 6 l/min or 5 l/min, the oxygen concentration of the oxygen enriched gas D can be maintained at a constant level regardless of a change in a flow rate of the gas D. A pressure reduction control valve 29 maintains a pressure level of the oxygen enriched gas flowing from the storage tank 3 at a constant level, thereby enabling an accurate metering or measuring operation of the flow rate metering means 38.

In the present embodiment of FIG. 4A, the controller 39 is also electrically connected to a three way valve 9 and the shut-off valves 7, 8, 14, and 18, to control the operation of these valves. As a result, an automatic control of the sequence of adsorbing process, the desorbing process, and the pressure equalizing process for each of the adsorbing beds 1 and 2 can be accurately achieved. That is, the time cycle for repeating the above-mentioned three processes can be controlled by the controller 39 in response to a change in an oxygen concentration of the oxygen enriched gas D delivered from the outlet of the apparatus.

Alternatively, the apparatus of FIG. 4A may be constructed in such a manner that the association of the operation of the flow rate metering means 38 and the flow control valve 36 of the bypass conduit 35 is achieved by the use of an appropriate mechanically associated element, such as a gear train mechanism. In that case, the flow control valve 36 may be, e.g., a conventional needle valve having a continuous or stepwise opening adjustment mechanism.

Figue 4B illustrates a perspective view of the general configuration of the apparatus of FIG. 4A. As will be understood from FIG. 4B, the apparatus is constructed as a single unit contained in an outer casing 40 in the shape of a parallelepiped casing. The outer casing 40 has an inlet 41 for air A to be compressed by the compressor 4 and an outlet 42 for the oxygen enriched gas D. An exhaust line for the drain B and an exhaust line for the nitrogen enriched gas C generated due to desorbing process are also appropriately arranged. The entire arrangement of the apparatus as described with reference to FIG. 4A is accommodated inside the outer casing 40. Additionally, a fan 44 is used for cooling the compressor 4.

Figure 5:
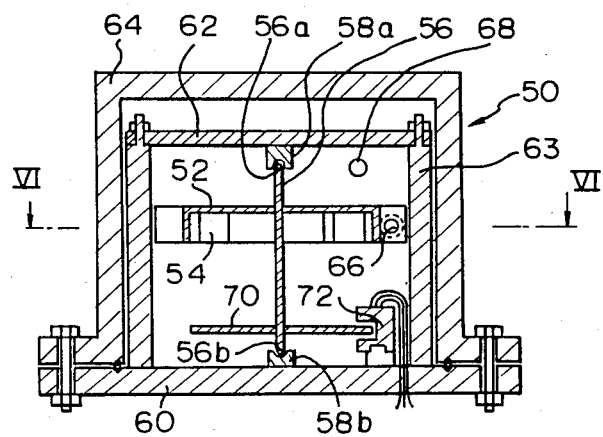
FIG. 5 is a vertical cross-sectional view of an inferential flow meter adapted to be accommodated in an oxygen enriching apparatus, according to the present invention.
Figure 6:
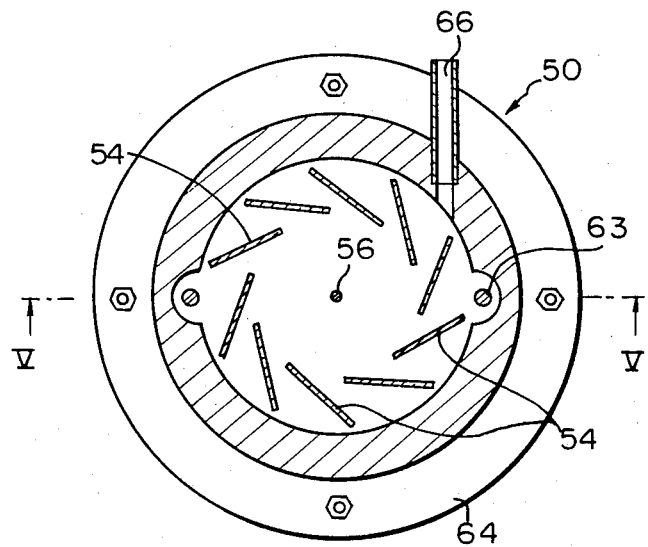
FIG. 6 is a cross-sectional view taken along the line VI—VI of FIG. 5.

FIGS. 5 and 6 illustrate a flow rate metering device according to a preferred embodiment of the present invention, which can be accommodated in an oxygen enriching apparatus, for accurately metering or measuring an amount of flow of an oxygen enriched gas or other gas to be utilized for an intended use, such as an oxygen inhalation treatment.

As best illustrated in FIG. 5, the flow rate metering device of the present embodiment is constructed as an inferential flow meter 50 provided with a rotatably supported wheel 52 having a plurality of vanes 54 against which a flow of the oxygen enriched gas to be measured impinges to cause a rotation of the wheel 52. The rotational speed of the wheel 52 varies linearly with the flow rate of the gas, and thus, by detecting the rotational speed of the wheel 52, it is possible to measure the flow rate of the oxygen enriched gas. The wheel 52 is fixedly mounted on a shaft 56 having pivoted ends 56a and 56b and rotatably supported by pivot bearings 58a and 58b. Preferably, the wheel 52 is arranged in such a manner that the shaft 56 is substantially vertical to a flow direction of the oxygen enriched gas, from the viewpoint of an accurate measurement of a low flow rate of the oxygen enriched gas. However, the shaft 56 may be arranged in parallel with the flow direction of the oxygen enriched gas, as required.

The above-described pivot bearings 58a and 58b are preferred because of a low friction property and low manufacturing cost. Alternately, a jewel bearing having a mortise therein may be used for supporting the shaft 56, from the viewpoint of obtaining a low friction bearing.

When the pivot bearings 58a and 58b are employed for rotatably supporting the shaft 56 at both pivot ends 56a and 56b, the shaft 56 having the wheel 52 mounted thereon may be horizontally arranged. However, from the viewpoint of achieving an accurate measurement of a flow rate of the oxygen enriched gas in a low rotational speed range as well as a good repeatability, the shaft 56 is preferably vertically arranged even if the low frictional pivot bearings 58a and 58b are employed. Each of the pivot bearings 58a and 58b may be made of a jewel material, such as a ruby, a sapphire or an agate, a glass, or an alloy, such as a beryllium-copper. Further, the pivot bearings 58a and 58b are preferably threadedly attached to a base plate 60 and to a support plate 62 fixed to support posts 63, so that any play between the pivot bearings 58a and 58b and the pivot ends 56a and 56b of the shaft 56 can be removed by the threaded adjustment of these bearings. The shaft 56 may be made of a light metallic material, such as an aluminum. However, the pivot ends 56a and 56b of the aluminum shaft 56 should be formed as separate elements made of a hardenable metallic material, and should be threadedly attached to both ends of the aluminum shaft 56. This separate construction of the pivot ends 56a and 56b will make replacement possible when abrasion occurs. Further an appropriate locking member or device (not shown) may be incorporated inside an outer cylindrical casing 64 so that the wheel 52 and the shaft 56 having pivot ends 56a and 56b are suitably locked when the inferential flow meter 50 is not used or the instrument is to be transported.

The plurality of vanes 54 (generally 3 to 16 vanes) are preferably arranged at an outer periphery of the plate-like wheel 52 and are plate members, as best shown in FIG. 6. The arrangement of the vanes 54 illustrated in FIG. 6 is chosen so that the flow of the oxygen enriched gas to be metered is introduced into the casing 64 in a direction tangential to the plate-like wheel 56 via a gas inlet 66. The vanes 54 are disposed so that each of the vanes 54 is appropriately inclined with respect to a radial direction of the plate-like wheel 52. As a result, the flow of the oxygen enriched gas causes the wheel to rotate about an axis of the shat 56 without an irregular rotational motion. Preferably, the flow of the oxygen enriched gas is introduced so as to apply a floating force to the wheel 52, thereby preventing at least the upper pivot end 56a, preferably both pivot ends 56a and 56b of the shaft 56, from coming into contact with the pivot bearings 58a and 58b. Thus, a low frictional rotation of the wheel 52 is obtained, resulting in accurate measurement of the flow rate of the oxygen enriched gas. An outlet 68 is formed in a cylindrical side wall of the outer casing 64 to allow the flow of the oxygen enriched gas to flow out of the device 50.

The wheel 52 in the shape of a plate-like element is preferably and practically made of an aluminum material and is covered with an alumilite coating from the viewpoint of light weight and easy machinability. However, another light weight and easy machinable metallic material may be utilized for the wheel 52.

The inferential flow metering device 50 is also provided with a rotary plate 70 attached to the shaft 56 and an electrical speed detecting unit 72. The rotary plate 70 has a plurality of slits formed thereon (not illustrated in FIGS. 5 and 6). The electrical speed detecting unit 72 has a light emitting element, such as a conventional light-emitting diode and a photo electric detecting element, such as a phototransistor. The electrical speed detecting unit 72 detects the rotational speed of the rotary plate 70 rotating with the wheel 52, without coming into contact with the rotary plate 70. Thus, the electrical speed detecting unit 72 issues signals indicating the rotational speed of the wheel 52 which varies linearly with a change in a flow rate of the oxygen enriched gas. The signal issued from the electrical speed detecting unit 72 may be in the form of an electric digital signal. Alternately, an electro magnetic speed detecting unit may be used in place of the above-mentioned combination of the rotary plate 70 and the electrical speed detecting unit 72. In that case, a solenoid is arranged adjacent to the rotary wheel 52, and an electromagnetically induced electric voltage signal caused by an approach of a part of the wheel 52 to the solenoid is detected. Thus, a frequency change in the electric voltage signal will indicate the rotational speed of the wheel.

As described before, the inferential flow metering device 50 may be incorporated into an oxygen enriching apparatus of the present invention in order to accurately meter the flow rate of the oxygen enriching gas, and as a result, the device 50 can operate in association with the flow control valve arranged in the air bypass conduit so as to maintain a constant oxygen concentration of the oxygen enriched gas delivered from the apparatus. However, the inferential flow metering device 50 may be modified as shown in FIG. 7.

Figure 7:
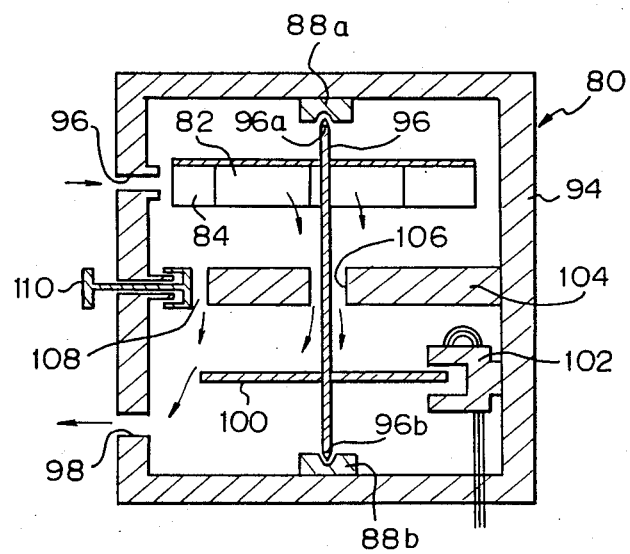
FIG. 7 is a vertical cross-sectional view of an inferential flow meter adapted to be accommodated in an oxygen enriching apparatus, according to an embodiment of the present invention, different from that of FIGS. 5 and 6.

FIG. 7 illustrates an inferential flow metering device according to another embodiment of the present invention.

The inferential flow metering device of FIG. 7 is an improvement of the device of FIGS. 5 and 6, to stably meter a large flow rate of the oxygen enriched gas without an increase in the friction at the support bearings supporting a rotary wheel, or an unbalanced rotation of the wheel.

In FIG. 7, the inferential flow metering device 80 has an outer casing 94 in the shape of a cylindrical box, in which a flow rate metering system is incorporated. The outer casing 94 is provided with a gas inlet 96 through which a flow of the oxygen enriched gas to be metered flows into the outer casing 94, and a gas outlet 98 out of which the flow of the gas after metering flows toward the outside of the casing 94. Arrows in FIG. 7 schematically indicate the flow of the oxygen enriched gas. The device 80 includes a rotary wheel 82 in the shape of a flat plate and a plurality of vanes 84 attached to the plate-like wheel 82 so as to hang therefrom. The rotary wheel 82 is fixedly mounted on a shaft 96 rotatably supported at both pivot ends 96a and 96b thereof by upper and lower pivot bearings 88a and 88b. Note, a predetermined amount of play, i.e., approximately 3 mm, is left between each of the pivot ends 96a and 96b and the associated pivot bearing 88a or 88b. A rotary plate 100 having a plurality of slits is mounted on the shaft 96 and is rotated together with the rotary wheel 82. The rotary plate 100 acts as a rotational speed signal generator. The rotational speed of the rotary plate 100 is detected by an electric speed detecting unit 102 having a light emitting element to emit a light onto the rotary plate 100 and a photo electric detecting element (a photo transistor) to detect the light from the light emitting element which has passed through the rotary plate 100. The inferential flow metering device 80 is also provided, inside the outer casing 94, with a partition plate 104 arranged at a vertically middle portion in the cavity of the outer casing 94. The partition plate 104 has a central aperture 106 defined around the shaft 96. The partition plate 104 also defines, at a position adjacent to the outer periphery thereof, a bypass passageway 108 having a cross-sectional passage area which can be adjusted by an appropriate adjusting device 110.

With the above-mentioned arrangement of the inferential flow metering device 80, a flow of the oxygen enriched gas or other gas into the casing 94 rotates the wheel 82 and, subsequently, passes through the central aperture 106 into the lower cavity beneath the partition plate 104. The flow of the gas then impinges against the rotary plate 100 while applying a downward force thereto. As a result, an excess floating force acting on the wheel 82 during the rotation of the wheel 82 is suppressed, and accordingly, the rotary wheel 82 as well as the rotary plate 100 are stably rotated so as to carry out an accurate measurement of the flow of the gas. The downward force acting on the rotary plate 100 can be adjusted by operating the adjusting device 110. That is, by adjusting the cross-sectional opening area 108, it is possible to control the amount of flow of the gas flowing through the aperture 106, and as a result, the above-mentioned downward force can be adjusted to an appropriate level.

On the other hand, when the rotary wheel 82 is arranged at the lowermost position within the casing 94, if the outer diameter of the wheel 82 is chosen so that the outer periphery thereof is adjacent to the inner wall of the outer casing 94, and if the rotary plate 100 and the outlet 98 are positioned above the wheel 82, the device can be used to accurately measure a low flow rate of the gas. That is, by this arrangement of the wheel 82 and the rotary plate 100, the flow of the gas flowing into the device will act so as to lift the wheel 82, thereby permitting the wheel 82 to rotate under a low friction. As a result, the device is able to meter a low flow rate of the gas.

It should be appreciated that the inferential flow metering device 80 of FIG. 7 can be accommodated in either one of the oxygen enriching apparatuses as described with reference to FIGS. 1 through 4B so as to accomplish an accurate measurement and setting of the flow rate of the oxygen enriched gas delivered from the apparatus. Particularly, the inferential flow metering device 80 can be used as the flow rate metering means 38 of the adsorbing type oxygen enriching apparatus of FIGS. 4A and 4B.

Figure 8:
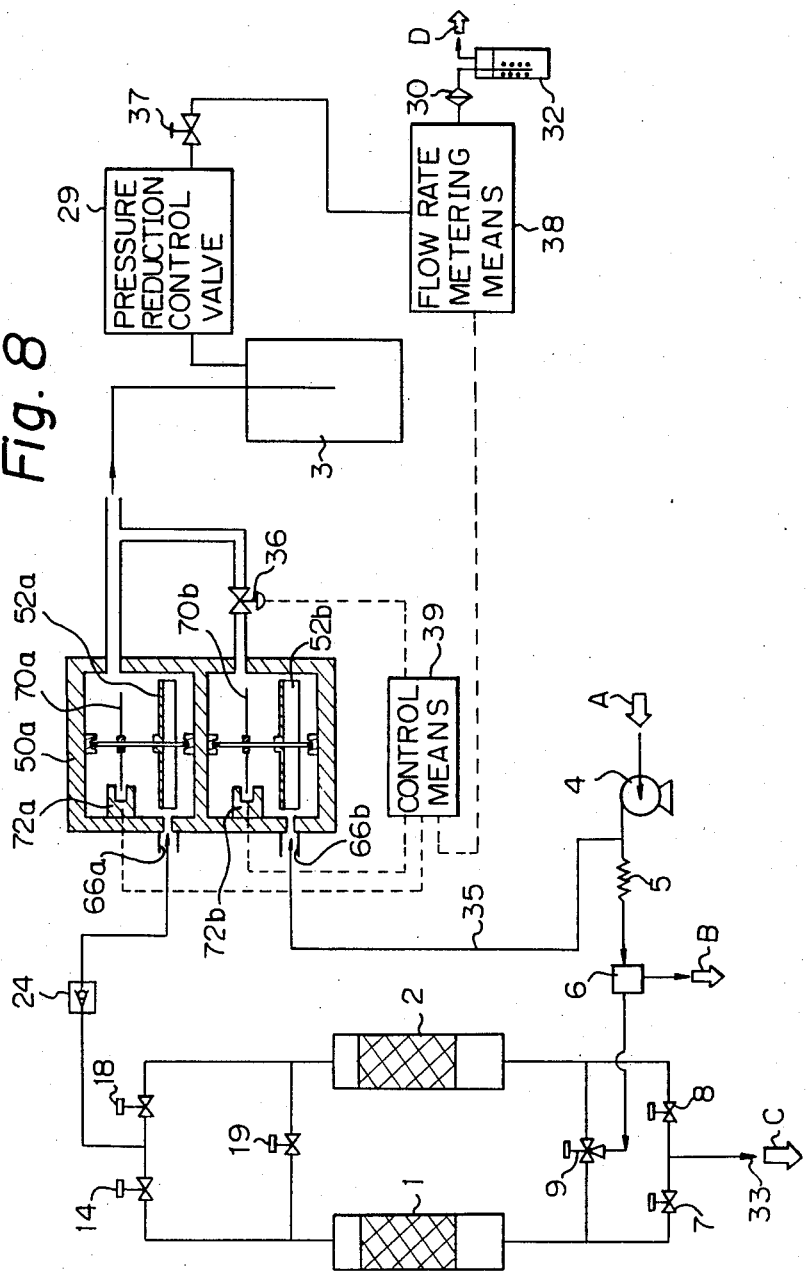
FIG. 8 is a diagrammatic view of an oxygen enriching apparatus according to a still further embodiment of the present invention, in which inferential flow meters are accommodated.

FIG. 8 illustrates an oxygen enriching apparatus according to a further embodiment, which incorporates an inferential flow metering device. In the apparatus, the elements designated by the same reference numerals as those of the apparatuses of FIGS. 1, 2, 3, 4A and 4B may be regarded as like or the same elements. Thus, the following description will be directed to the arrangement of the inferential flow metering device.

The oxygen enriching apparatus of FIG. 8 is constructed as an adsorbing type oxygen enriching apparatus and includes an inferential flow metering device 50a having a pair of flow metering systems. One of the flow metering systems comprises a rotatably wheel 52a, a rotational speed signal generating plate 52a, and a rotational speed detecting unit 72a, and the other flow metering system is constituted by a rotatably wheel 52b, a rotational speed signal generating plate 52b, and a rotational speed detecting unit 72b. Both rotational speed detecting units 72a and 72b are electrically connected to the control means 39, which may comprise a conventional electronic micro-processor unit.

The device 50a also has an inlet 66a for introducing, via the check valve 24, the oxygen enriched gas produced by the adsorbing beds 1 and 2 and another inlet 66b for air A under pressure fed from the compressor 4, via the gas conduit 35. Since the air A under pressure is used as an oxygen concentration diluting gas, a nitrogen enriched gas C may be alternatively used as the oxygen concentration diluting gas. Then, the nitrogen enriched gas C is introduced into the inferential flow metering device 50a via the inlet 72b. The inferential flow metering device 50a measures both the flow of the oxygen enriched gas and the oxygen concentration diluting gas. The resultant signals of the measurement are fed to the control means 39 to control the opening of a flow control valve 36, and as a result, the amount of the oxygen concentration diluting gas mixed with the oxygen enriched gas is regulated to achieve a desired oxygen concentration of the oxygen enriched gas D delivered from the apparatus. At this stage, according to the present embodiment of FIG. 8, the control means 39 is also electrically connected in the flow rate metering means 38, which may be an inferential flow metering device as described with reference to FIGS. 5 through 7. Thus, the oxygen concentration regulation by the employment of the oxygen concentration diluting gas, i.e., the air A under pressure or the nitrogen enriched gas C, can be achieved with a greater accuracy. Therefore, it is possible to obtain an accurately measured amount of the oxygen enriched gas D from the outlet of the oxygen enriching apparatus of FIG. 8 under a constant desired oxygen concentration. Accordingly, the oxygen enriched gas D can be used not only for the medical treatment of a patient but also for other applications, such as a recovery of physical strength of a person after violent activity, fish farming, combustion air, or maintaining the freshness of vegetables.

Figure 9:
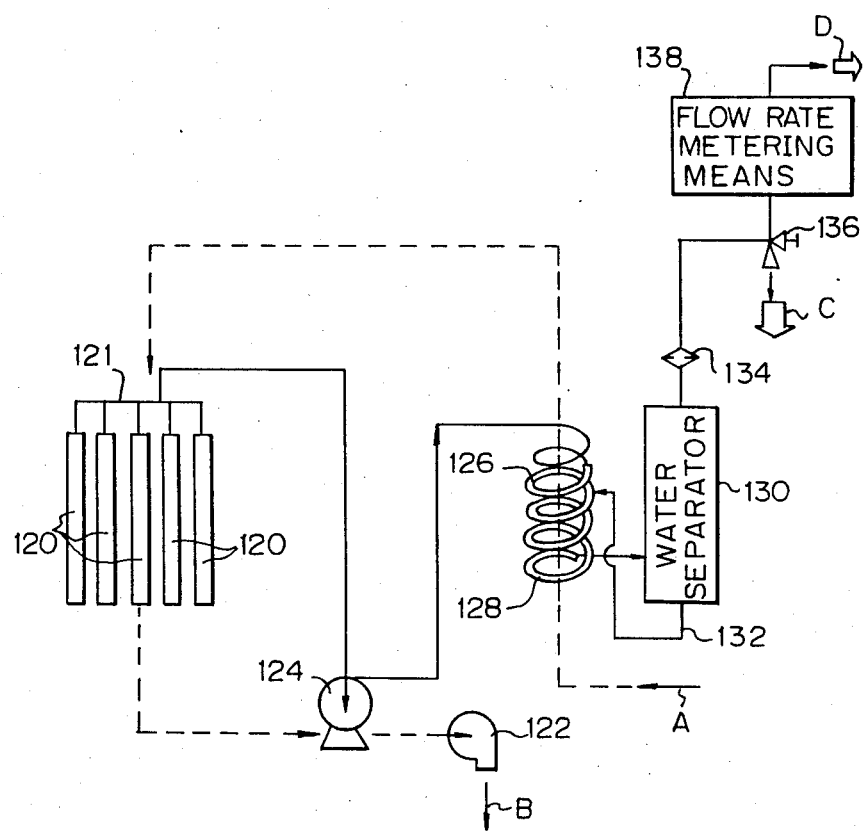
FIG. 9 is a diagrammatic view of a membrane separation type oxygen enriching apparatus according to an embodiment of the present invention.

FIG. 9 illustrates a membrane separation type oxygen enriching apparatus in which an inferential flow metering device according to the present invention is incorporated.

The membrane separation type oxygen enriching apparatus of the present embodiment includes membrane elements 120 which allow a permeation of oxygen more readily than nitrogen, a fan unit 122 for introducing the atmospheric air A under pressure into the apparatus via an appropriate air filtering unit (not shown), a vacuum unit 124 connected to the membrane elements 120 for applying a vacuum pressure to the inside of the membrane elements 120, i.e., for holding a vacuum pressure within the membrane elements 120, a cooling unit 126 surrounded by a water holder 128 made of, e.g., a fibrous material or the like, a water separator 130, a drain pipe 132, a filter element 134 (a disinfecting element), a flow control valve unit 136, and a flow rate metering device 138, which may be an inferential flow metering device 50 or 80 described before with reference to FIGS. 5 through 7. The air A under pressure introduced by the fan unit 122 passes through the cooling unit 126, the outer surfaces of the membrane elements 120, and around the vacuum unit 124. Thereafter, the air A under pressure is exhausted from the apparatus as an exhaust air B. The vacuum unit 124, which may be a conventional vacuum pump, takes an oxygen enriched gas out of the membrane elements 120 via an assembly of collecting pipes 121, and sends the oxygen enriched gas to the cooling unit 126 for cooling or condensation. Thereafter, a water component within the oxygen enriched gas is separated from the gas by the water separator 130. The separated water is sent to the water holder 128 of the cooling unit 126 via the drain pipe 132, to moisten the water holder 128. The dehumidified oxygen enriched gas is subsequently filtered, i.e. subjected to a disinfecting treatment by the filtering element 134, and then flows toward the outlet of the apparatus as an oxygen enriched gas D. The flow control valve 136 and the flow metering device 138 are used for setting a flow rate of the oxygen enriched gas D to a required flow rate level.

At this stage, the oxygen enriched gas produced by the membrane elements 120 often contains a water component, due to a water separation property of the membrane elements 120, and thus the gas is dehumidified or demoistened by the cooling unit 126, the water separator 130, the drain pipe 132 packed therein with fibers, and the water holder 128. The gas may still contain a water component, but even under this condition, the inferential flow metering device 50 or 80 comprising the flow rate metering unit 138 is able to accurately measure the flow rate of the oxygen enriched gas, compared with the conventional rotameter, which is often clogged by dew within the rotameter device. This is because the inferential metering device of the present invention is not easily effected by an adverse influence of the dew and thus it is possible to stably measure the flow rate of an oxygen enriched gas ranging from a small flow rate, such as 0.5 l/min, to a large flow rate, such as 8 l/min, with a reliable repeatability.

Although the invention has been described with particular reference to the preferred embodiments, various modifications and variations will occur to a person skilled in the art within the spirit and scope of the invention as claimed.

We claim:

1. An apparatus for producing an oxygen enriched gas from air comprising:
   an air source means comprising a compressor for supplying air under pressure to be enriched with oxygen;
   a means for producing a gas enriched with oxygen from said air supplied from said air source comprising at least one bed of adsorbent capable of adsorbing nitrogen more readily than oxygen;
   a first gas conduit means for fluid connection between said air source means and an inlet for said means for producing a gas enriched with oxygen through which air is introduced and an outlet thereof through which said oxygen enriched gas is discharged;
   a gas storage means for reserving a given amount of said oxygen enriched gas produced by said means for producing a gas enriched with oxygen;
   a second gas conduit means for fluid connection between said outlet of said means for producing a gas enriched with oxygen and said gas storage means;
   a third gas conduit for delivering said oxygen enriched gas from said gas storage means toward an outlet of said apparatus;
   a flow rate setting means for setting a flow rate of said oxygen enriched gas delivered from said gas storage means to said outlet of said apparatus via said third gas conduit means, said flow rate setting means being arranged in said third conduit means;
   a concentration regulating means for adjustably regulating an oxygen concentration of said oxygen enriched gas delivered from said outlet to said apparatus in response to a change in a requirement for an oxygen concentration in said oxygen enriched gas, and said apparatus further comprising a fourth gas conduit means for providing a fluid communication between said compressor and said gas storage means;
   a flow control means arranged in said fourth gas conduit means for adjustably regulating said fluid communication between said compressor and said gas storage means, thereby controlling a flow rate of said air from said compressor to said gas storage means in response to a change in a requirement for an oxygen concentration of said oxygen enriched gas.

2. An apparatus for producing an oxygen enriched gas from air according to claim 1, wherein said fourth gas conduit means is branched from a part of said first gas conduit means and is connected to an inlet of said gas storage means.

3. An apparatus for producing an oxygen enriched gas from air according to claim 1, wherein said fourth gas conduit means is branched from a part of said first gas conduit means and is connected to a part of said second gas conduit means.

4. An apparatus for producing an oxygen enriched gas from air according to claim 1, wherein said flow control means comprises:
a flow rate control valve having adjustable opening positions which permit said air from said compressor to flow into said gas storage means in response to a change in a requirement of an oxygen concentration of said oxygen enriched gas.

5. An apparatus for producing an oxygen enriched gas from air according to claim 4, wherein said flow rate control valve is operatively connected to said flow rate setting means arranged in said third gas conduit means thereby enabling an increase in flow rate of said air flowing through said fourth gas conduit means in response to an increase of flow rate of said oxygen enriched gas from said gas storage means.

6. An apparatus for producing an oxygen enriched gas from air according to claim 1, wherein said flow control means is operatively connected to said flow rate setting means arranged in said third gas conduit means, thereby enabling a fine adjustment of said fluid communication between said compressor and said gas storage means to maintain an oxygen concentration at a required level.

7. An apparatus for producing an oxygen enriched gas from air according to claim 1, wherein said flow rate setting means comprises:
a flow rate regulating means for selectively regulating a flow of said oxygen enriched gas delivered from said outlet of said apparatus and;
a flow rate metering means for measuring said flow of said oxygen enriched gas delivered from said flow rate regulating means.

8. An apparatus for producing an oxygen enriched gas from air according to claim 7, wherein said flow rate metering comprises an inferential flow meter for measuring a flow rate of said oxygen enriched gas, said inferential flow meter having a rotary wheel provided with a plurality of vanes and being operatively connected to said flow control means, for regulating an amount of said air supplied to said gas storage means via said fourth conduit means so that said amount of said air is regulated by said flow control means in response to a change in a flow rate of said oxygen enriched gas measured by said inferential flow meter.

9. An apparatus for producing an oxygen enriched gas from air according to claim 8, wherein said inferential flow meter further comprises a rotation signal generating means for generating a signal indicative of a rotation of said rotary wheel, and an electrical signal generating means for detecting said signal of said rotation signal generating means without coming into contact with said rotation signal generating means and converting said detected signal into an electrical signal indicative of a rotational speed of said rotary wheel.

10. An apparatus for producing an oxygen enriched gas from air according to claim 9, wherein said rotation signal generating means comprises a disc having a plurality of radial slits formed thereon and arranged to be rotatable with said rotary wheel, and wherein said electrical signal generating means comprises a photoelectric signal converter means.

11. An apparatus for producing an oxygen enriched gas from air according to claim 9, wherein said flow control means comprises a flow rate control valve for adjustably varying an amount of a flow of said air from said compressor to said gas storage means, and a control means connected to said electrical generating means of said inferential flow meter, for controlling said flow rate control valve in response to said electrical signal indicating a rotational speed of said rotary wheel.

12. An apparatus for producing an oxygen enriched gas from air according to claim 11, wherein a second and a third inferential flow meters are provided in addition to said afore-mentioned inferential flow meter, said second inferential flow meter being arranged in said second gas conduit means for measuring a flow rate of said oxygen enriched gas flowing from said bed of adsorbent toward said gas storage means, and said third inferential flow meter being arranged in said fourth conduit means upstream of said flow control valve, for measuring a flow rate of air flowing from said compressor toward said gas storage means, said second and third inferential flow meters being operatively connected to said control means.

13. An apparatus for producing an oxygen enriched gas from air according to claim 8, wherein said rotary wheel has a shaft rotatably supported by pivot bearing means.

14. An apparatus for producing an oxygen enriched gas from air according to claim 1, further comprising:
a pressure reduction control valve arranged in said third conduit for controlling a pressure level of said oxygen enriched gas to a desired level suitable for a final use of said oxygen enriched gas.

15. A high oxygen concentration gas supply apparatus comprising:
means for generating a gas having an oxygen concentration higher than the atmospheric air;
means for delivering said gas having an oxygen concentration higher than the atmospheric air to an outlet of said apparatus;
flow regulating means for adjustably regulating a flow of said gas delivered by said gas delivering means; and
flow metering means for measuring said flow of gas delivered by said gas delivering means, wherein said flow metering means comprises:
an inferential flow meter which comprises:
a casing;
a rotary wheel rotatably arranged within said casing, and provided with a plurality of vanes;
an inlet means for introducing said gas into said casing and directing said gas toward said rotary wheel thereby causing a rotation of said rotary wheel;
an outlet means for flowing said gas out of said casing; and
means for measuring a flow rate of said gas through a detection of a rotation of said rotary wheel.

16. A high oxygen concentration gas supply apparatus according to claim 15, wherein said rotary wheel is mounted on a rotatable shaft, said rotatable shaft being supported by pivot bearing means fixedly arranged on said casing.

17. A high oxygen concentration gas supply apparatus according to claim 16, wherein said rotatable shaft is disposed so as to be substantially vertical within said casing.

18. A high oxygen concentration gas supply apparatus according to claim 15, wherein said rotary wheel comprises a disc member having an outer periphery whereat said plurality of vanes are arranged in such a manner that each of said vanes is inclined from a radial direction with respect to a center of said disc member, and wherein said inlet means allows said introduced gas to collide with said plurality of vanes from a tangential direction of said disc member, to cause rotation of said disc.

19. A high oxygen concentration gas supply apparatus according to claim 15, wherein said means for measuring a flow rate of said gas of said inferential flow meter comprises:
a rotation signal generating means for generating a signal indicative of a rotation of said rotary wheel; and
an electrical signal generating means for detecting said signal of said rotation signal generating means without coming into contact with said rotation signal generating means and converting said detected signal into an electrical output signal indicating a rotational speed of said rotary wheel.

20. A high oxygen concentration gas supply apparatus according to claim 19, wherein said rotation signal generating means comprises another disc having a plurality of radial slits formed thereon and arranged to be rotatable with said rotary wheel, and wherein said electrical signal generating means comprises a photoelectric signal converter means arranged adjacent to said another disc.

21. A high oxygen concentration gas supply apparatus according to claim 15, wherein said means for generating a gas having an oxygen concentration higher than the atmospheric air comprises an oxygen enriching means for producing a gas enriched with oxygen from the atmospheric air.

22. A high oxygen concentration gas supply apparatus according to claim 21, wherein said oxygen enriching means comprises:
a selectively permeable membrane capable of permeating oxygen more readily than nitrogen; and
means for applying said atmospheric air to said selectively permeable membrane.

23. A high oxygen concentration gas supply apparatus according to claim 21, wherein said oxygen enriching means comprises:
a bed of adsorbent selectively adsorbing either one of oxygen and nitrogen from said atmospheric air;
means for applying said atmospheric air to said bed of adsorbent;
means for taking oxygen enriched gas out of said bed of adsorbent; and
gas storage means for reserving said oxygen enriched gas.

24. A high oxygen concentration gas supply apparatus according to claim 21, further comprising means for mixing a diluting gas with said oxygen enriched gas upstream of an outlet of said apparatus, thereby lowering an oxygen concentration, and means for regulating an amount of said diluting gas.

25. A high oxygen concentration gas supply apparatus according to claim 24, wherein said means for regulating an amount of said diluting gas is operatively connected to said inferential flow meter.

26. An apparatus for producing an oxygen enriched gas and air comprising:
air source means comprising a compressor for supplying air under pressure, to be enriched with oxygen;
means for producing a gas enriched with oxygen comprising at least one bed of adsorbent capable of adsorbing nitrogen more readily then oxygen from said air supplied from said compressor, said bed of adsorbent having an inlet thereof through which said air is introduced and an outlet thereof through which said oxygen enriched gas is discharged;
a first gas conduit means for fluid connection between said air source means and said means for producing a gas enriched with oxygen;
a gas storage means for reserving a given amount of said oxygen enriched gas delivered from said outlet of said bed of adsorbent;
a second gas conduit means for fluid connection between said means for producing a gas enriched with oxygen and said gas storage means;
a third gas conduit means for delivering said oxygen enriched gas from said gas storage means toward an outlet of said apparatus;
a flow rate setting means for setting a flow rate of said oxygen enriched gas delivered from said gas storage means to said outlet of said apparatus via said third gas conduit means, said flow rate setting means being arranged in said third conduit means; and
a concentration regulating means for adjustably regulating an oxygen concentration of said oxygen enriched gas delivered from said outlet of said apparatus in response to a change in a requirement for oxygen concentration of said oxygen enriched gas, said concentration regulating means comprising a first means for allowing said oxygen enriched gas with a first predetermined oxygen concentration level to be delivered from said outlet of said apparatus, and a second means for allowing said oxygen enriched gas with at least one different predetermined oxygen concentration level to be delivered from said outlet of said apparatus.

27. An apparatus for producing an oxygen enriched gas from air according to claim 26, wherein said first means of said concentration regulating means comprises at least one valve means which can be set at a predetermined opening position thereof to provide said first predetermined oxygen concentration level, and wherein said second means of said concentration regulating means comprises at least one valve means which can be selectivity set at an opening position thereof to provide set said at least one different predetermined oxygen concentration level.

28. An apparatus for producing an oxygen enriched gas from air according to claim 27, wherein each of said first and second means of said concentration regulating means comprises flow choke means arranged in said second gas conduit means for selectively subjecting the flow of said oxygen enriched gas flowing from said outlet of said bed of adsorbent toward said gas storage means to one of a predetermined number of flow resistancs in response to a change in an oxygen concentration of said oxygen enriched gas.

29. An apparatus for producing an oxygen enriched gas from air according to claim 28, wherein said flow choke means comprises a plurality of orifices, arranged in series and in parallel with one another in said second conduit means at a position adjacent to said outlet of said bed of adsorbent, said plurality of orifices defines different predetermined openings in said second conduit means, respectively, and wherein a first valve means is disposed for determining which one of said plurality of orifices is used for permitting said oxygen enriched gas to flow toward said gas storage means in response to a change in an oxygen concentration of said oxygen enriched gas.

30. An apparatus for producing an oxygen enriched gas from air according to claim 29, wherein said plurality of orifices comprises a pair of orifices arranged in said second gas conduit in parallel with one another and having different sizes of openings defined in said second gas conduit for permitting said oxygen enriched gas to flow toward said gas storage means in response to a change in an oxygen concentration of said oxygen enriched gas.

31. An apparatus for producing an oxygen enriched gas from air according to claim 27, wherein said means for producing a gas enriched with oxygen comprises two or more separate beds of adsorbent which are respectively connected to said compressor for supplying air under pressure, each of said separate beds of adsorbent having an inlet for introducing air from said compressor and an outlet for delivering said oxygen enriched gas toward said gas conduit means between said two or more separated beds of adsorbent and said gas storage means.

* * * * *

UNITED STATES PATENT AND TRADEMARK OFFICE
CERTIFICATE OF CORRECTION

PATENT NO. : 4,822,384
DATED : April 18, 1989
INVENTOR(S) : Akira Kato, et al.

It is certified that error appears in the above-identified patent and that said Letters Patent is hereby corrected as shown below:

Column 5, line 21, change "comprise" to --comprises--.

Column 5, line 40, change "orifice" to --orifices--.

Column 7, line 1, delete "a".

Column 8, line 61, between "of" and "absorbing" insert --the--.

Column 10, line 30, change "shat" to --shaft--.

Column 12, lines 47 and 50, change "rotatably" to --rotatable--.

Column 16, line 16, change "meters" to --meter--.

Column 18, line 4, change "and" to --from--.

Signed and Sealed this

Fourth Day of February, 1992

Attest:

HARRY F. MANBECK, JR.

*Attesting Officer*     *Commissioner of Patents and Trademarks*